Oct. 9, 1923.

R. HOHNBACH

VALVE FACING TOOL

Filed June 16, 1923

1,469,935

Inventor
ROBERT HOHNBACH,
By Chas. J. Williamson
Attorney

Patented Oct. 9, 1923.

1,469,935

UNITED STATES PATENT OFFICE.

ROBERT HOHNBACH, OF CHICAGO, ILLINOIS.

VALVE-FACING TOOL.

Application filed June 16, 1923. Serial No. 645,899.

*To all whom it may concern:*

Be it known that I, ROBERT HOHNBACH, residing at 3502 Lake Park Avenue, Chicago, Cook County, Illinois, a citizen of the United States, have invented certain new and useful Improvements in Valve-Facing Tools, of which the following is a specification.

With devices or tools for facing gas engine valves, that are in use, known to me, the operation is slow and not easily done. The object of my invention is to provide a tool for this purpose which will enable the work to be done quickly and with ease, which will assure accuracy, and, withal, will be simple and inexpensive to construct, and small and of light weight. My invention, therefore, consists in whatever tool is defined by or included within the terms or scope of the claims which appear at the end of the following description.

In the annexed drawings:—

Briefly described, a tool embodying my invention comprises a chuck adapted to be held in an ordinary bench vise, by which the valve stem may be held or clamped, but not so tight but that the valve may be rotated by a suitable tool applied to the customary holes in the valve head, and a cutter holder that is adjustably mounted on the chuck by which the cutter may be placed and securely held at the precise angle required for action on the seating face of the valve.

Figure 1:
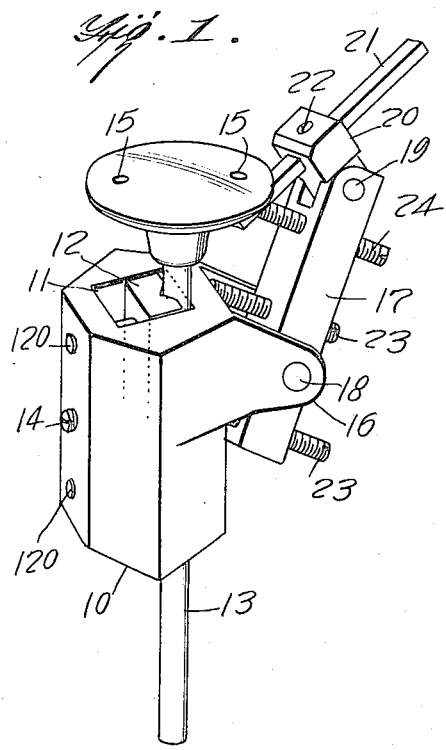
Fig. 1 is a perspective view of a valve facing tool embodying my invention.
Figure 2:
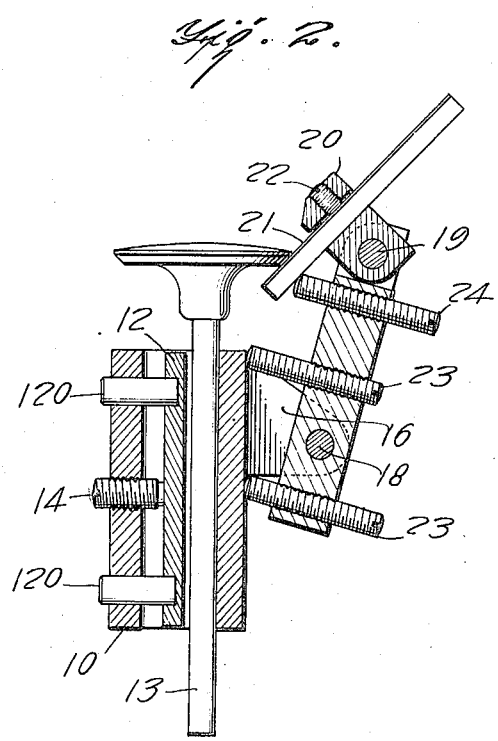
Fig. 2 is a vertical section thereof.

Referring in detail, to what is shown in the drawings, and first to Figs. 1 and 2 the chuck comprises a body, 10, with flat exterior sides to be satisfactorily engaged by the jaws of the bench vise, and perforated from end to end by a passage or hole, 11, within which is a movable bar, 12, between one face of which and an opposing flat wall of the hole, 11, the stem, 13, of a valve may be placed and clamped by means of a screw, 14, that engages a threaded hole in the body, 10, through which it passes from the exterior of the body, where its outer end is accessible to a screw driver. Pins 120 above and below the screw, 14, attached to the bar, 12, pass slidably through holes in the body, 10, and serve to support and guide the bar, 12. The stem-engaging side of the bar, 12, is preferably V-shaped, so that while the stem is securely held, it may nevertheless rotate when a turning tool is applied to the diametrically opposite holes, 15, in the valve head. The turning tool may be an ordinary brace.

Extending laterally from the body, 10, is an arm, 16, that is slotted to receive a bar, 17, which is pivoted by a pin, 18, to the arm so that it may swing towards and from the body, 10, and to the end opposite where it is pivoted, has pivoted to it, as by a pin, 19, a block, 20, which is a holder for the valve cutting tool, 21, in the form of a straight bar that passes through a hole in the holder, and is clamped thereto by a screw, 22. The bar, 18, and the tool holder, 20, swing on their pivots towards and from the valve head, and as each may swing independently of the other, it will be seen that a close or very fine, or nice, adjustment of the angle of the cutter to the valve head may be secured, so that the valve-seating face can be dressed off or ground with the necessary accuracy of angle. For adjusting the angle of the bar, 17, and holding it firmly in its adjusted position, there are two screws, 23, placed respectively on opposite sides of the bar pivot, which pass through threaded holes in the bar, and impinge or bear, at their inner ends, against the chuck body, 10; and to adjust the angle of the cutter by moving the holder, 20, on its pivot, an adjusting screw, 24, is passed through a threaded hole in the bar, 17, so that its end impinges or bears against the cutter at a point between the pivot, 19, and its end towards the valve head.

Figure 4:
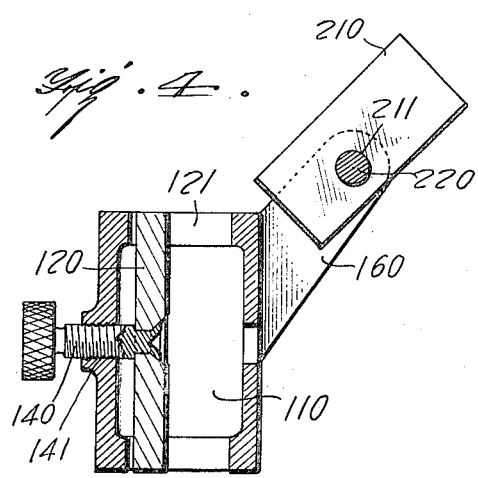
Fig. 4 is a vertical section through the same.
Figure 3:
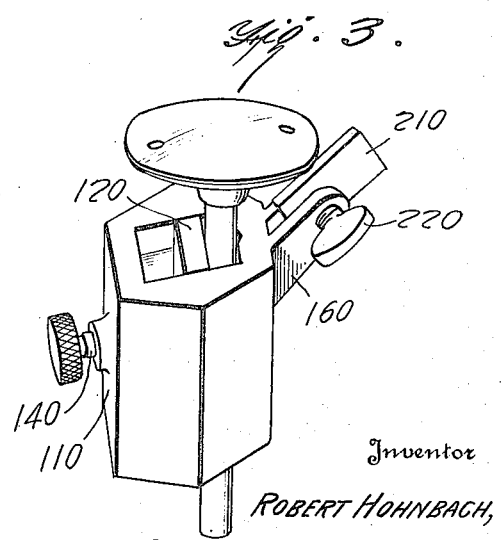
Fig. 3 is a perspective view of another embodiment of my invention.

The embodiment of my invention shown in Figs. 3 and 4 is a simpler and therefore more desirable construction than is shown in Figs. 1 and 2. Describing in detail what is shown in Figs. 3 and 4 the body, 100, is a hollow or chambered one with flat exterior sides, preferably hexagonal in cross section, for engagement by the jaws of a bench vise, the chamber, 110, being for the insertion of the stem of the valve to be ground and the accommodation of the stem clamping bar, 120, which at its ends slidably engages rectangular openings, 121, at the top and bottom of the block to guide the bar, 120, towards and from the opposite interior side of the chamber in clamping a valve stem thereagainst and releasing it. Intermediate its ends the bar, 120, has swivelled to it an adjusting screw, 140, which engages a threaded hole, 141, in the body, 110, by the turning of which screw the bar, 120, is moved back and forth being restrained from turning by the engagement of its ends with the openings, 121. On the side of the body, 121, opposite the screw there is an integral upwardly and outwardly inclined arm, 160, which is bifurcated to receive a thin oblong plate, 210, of tool steel hardened, which constitutes the valve cutting or grinding tool and which has a hole, 211, through which passes a set screw, 220, which also passes through alining holes in the arm, 160, and which forms a pivot upon which the tool, 210, may be turned to the proper angle for cutting and for clamping the tool in such position by pressure of the forks of the arm, 160, against the side thereof.

While I find that in practice, the construction, even as to details, which I show in the drawings, provides a most excellent tool, in all respects, yet I do not restrict myself to that construction, but deem myself entitled to protection that will include other, or different constructions of tool.

This application is a continuation in part of my application No. 563,484 filed May 25, 1922.

What I claim is:—

1. A valve dressing tool comprising a body having a hole extending through it to receive the stem of a valve and adapted to be held from turning on an axis passing longitudinally through such hole, means to clamp a valve stem against one side of said hole comprising a bar, extending parallel with the valve stem when in the hole, means to guide the bar in its clamping movement, and a screw engaging the bar and passing through a hole in the body to the exterior where it is accessible for turning, and a cutter supported upon the side of said body opposite the point of application of stem clamping pressure upon said bar and adjustable to change its angle with reference to the valve.

2. A valve dressing tool comprising a hollow elongated body with a plurality of flat outer sides fitted for engagement by the jaws of a vise and having a hole that extends through the body from end to end in the direction of its length, means to clamp a valve stem against one side of said hole comprising a bar, means to guide the bar in its clamping movement and a screw engaging said bar intermediate its ends and passing through a threaded hole in the body, and a cutter pivotally mounted upon the side of said body opposite the point of application of stem clamping pressure upon said bar.

3. A valve dressing tool comprising a body which has a valve stem receiving chamber and has a plurality of flat outer sides fitted for engagement by the jaws of a vise, a stem clamping bar within the body, the body having surfaces to guide the bar in its clamping movement, a screw engaging said bar between its ends and passing through a threaded hole in the body, an arm extending from the exterior of the body, a cutter, and means for clamping the cutter to the arm at a desired angle.

In testimony whereof I hereunto affix my signature.

ROBERT HOHNBACH.